(12) United States Patent
Gharavi et al.

(10) Patent No.: US 10,323,943 B2
(45) Date of Patent: Jun. 18, 2019

(54) WIRELESS RECEIVER WITH TRACKING USING LOCATION, HEADING, AND MOTION SENSORS AND ADAPTIVE POWER DETECTION

(71) Applicant: Movandi Corporation, Newport Beach, CA (US)

(72) Inventors: Sam Gharavi, Irvine, CA (US); Farid Shirinfar, Granada Hills, CA (US); Seunghwan Yoon, Irvine, CA (US); Alfred Grau Besoli, Irvine, CA (US); Maryam Rofougaran, Rancho Palos Verdes, CA (US); Ahmadreza Rofougaran, Newport Coast, CA (US)

(73) Assignee: Movandi Corporation, Newport Beach, CA (US)

( * ) Notice: Subject to any disclaimer, the term of this patent is extended or adjusted under 35 U.S.C. 154(b) by 243 days.

(21) Appl. No.: 15/225,523

(22) Filed: Aug. 1, 2016

(65) Prior Publication Data
US 2018/0045518 A1    Feb. 15, 2018

(51) Int. Cl.
| | | |
|---|---|---|
| *G01S 19/45* | (2010.01) | |
| *G01C 21/16* | (2006.01) | |
| *G01S 5/00* | (2006.01) | |
| *G01S 5/02* | (2010.01) | |
| *G01S 19/49* | (2010.01) | |

(Continued)

(52) U.S. Cl.
CPC .......... *G01C 21/165* (2013.01); *G01S 5/0027* (2013.01); *G01S 5/0263* (2013.01); *G01S 3/043* (2013.01); *G01S 3/28* (2013.01); *G01S 3/40* (2013.01); *G01S 3/42* (2013.01); *G01S 3/48* (2013.01); *G01S 19/47* (2013.01); *G01S 19/49* (2013.01); *H04B 7/086* (2013.01); *H04B 7/0857* (2013.01); *H04B 7/10* (2013.01)

(58) Field of Classification Search
CPC ..... G01C 21/165; G01C 21/28; G01S 5/0027; G01S 5/0263; G01S 19/49; G01S 19/47
USPC .......................... 342/357.28, 357.3, 357.32
See application file for complete search history.

(56) References Cited

U.S. PATENT DOCUMENTS

| | | | |
|---|---|---|---|
| 6,175,327 B1 * | 1/2001 | Lin ...................... | H01Q 3/2611 342/357.64 |
| 7,526,249 B2 * | 4/2009 | Waltman ................ | H01Q 19/17 343/754 |

(Continued)

*Primary Examiner* — Chuong P Nguyen
(74) *Attorney, Agent, or Firm* — Farjami & Farjami LLP (57) ABSTRACT

A wireless receiver includes an antenna panel providing input to an H-combined/V-combined generation block, a hybrid tracking system receiving input from the H-combined/V-combined generation block, the hybrid tracking system comprising location, heading and motion (LOHMO) sensors for providing a general position input to a digital core, the hybrid tracking system further comprising first and second power detectors for measuring power received from the antenna panel and for providing a precise position input to the digital core, the hybrid tracking system providing phase feedback signals to the H-combined/V-combined generation block. At least one of the phase feedback signals is provided to at least one phase shifter in the H-combined/V-combined generation block to cause a phase shift in at least one linearly polarized signal received from at least one antenna in the antenna panel.

10 Claims, 6 Drawing Sheets

(51) Int. Cl.

| | | |
|---|---|---|
| *G01S 19/47* | (2010.01) | |
| *G01S 3/04* | (2006.01) | |
| *G01S 3/28* | (2006.01) | |
| *G01S 3/40* | (2006.01) | |
| *G01S 3/42* | (2006.01) | |
| *G01S 3/48* | (2006.01) | |
| *H04B 7/08* | (2006.01) | |
| *H04B 7/10* | (2017.01) | |

(56) References Cited

U.S. PATENT DOCUMENTS

| | | | |
|---|---|---|---|
| 7,545,894 B2 * | 6/2009 | Ziedan | G01S 19/243 |
| | | | 340/426.19 |
| 8,160,530 B2 * | 4/2012 | Corman | H01Q 3/26 |
| | | | 343/756 |
| 8,184,047 B1 * | 5/2012 | Lennen | G01S 19/24 |
| | | | 342/357.67 |
| 9,053,516 B2 * | 6/2015 | Stempora | G06Q 40/08 |
| 9,537,214 B2 * | 1/2017 | Corman | H01Q 3/34 |
| 9,722,322 B2 * | 8/2017 | Bertin | H01Q 21/24 |
| 2010/0261440 A1 * | 10/2010 | Corman | H01Q 3/26 |
| | | | 455/91 |
| 2014/0009347 A1 * | 1/2014 | Bertin | H01Q 1/2258 |
| | | | 343/725 |
| 2015/0130664 A1 * | 5/2015 | Hill | G01S 5/0027 |
| | | | 342/451 |
| 2018/0040946 A1 * | 2/2018 | Boers | H01Q 1/38 |

\* cited by examiner

WIRELESS RECEIVER WITH TRACKING USING LOCATION, HEADING, AND MOTION SENSORS AND ADAPTIVE POWER DETECTION

BACKGROUND

Wireless communications, such as satellite communications, utilize electromagnetic waves to transfer information between two or more points. An electromagnetic wave includes an electric field and a magnetic field that are perpendicular to each other and to the direction of propagation. The orientation of the electric field may be characterized by its polarization, as the electromagnetic wave propagates through space. Two common types of polarizations are linear (e.g. vertical and horizontal) polarization and circular (e.g., right-hand and left-hand) polarization.

Wireless connectivity has expanded its reach from mobile phones to cars, airplanes and ships. When a change in position of a wireless receiver is made, the received power of desired signals may be significantly reduced. Accordingly, there is a need in the art for a wireless receiver that efficiently and effectively adjusts to changes in position so that the received power of desired signals is not significantly reduced.

SUMMARY

The present disclosure is directed to a wireless receiver with tracking using location, heading and motion sensors and adaptive power detection, substantially as shown in and/or described in connection with at least one of the figures, and as set forth in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
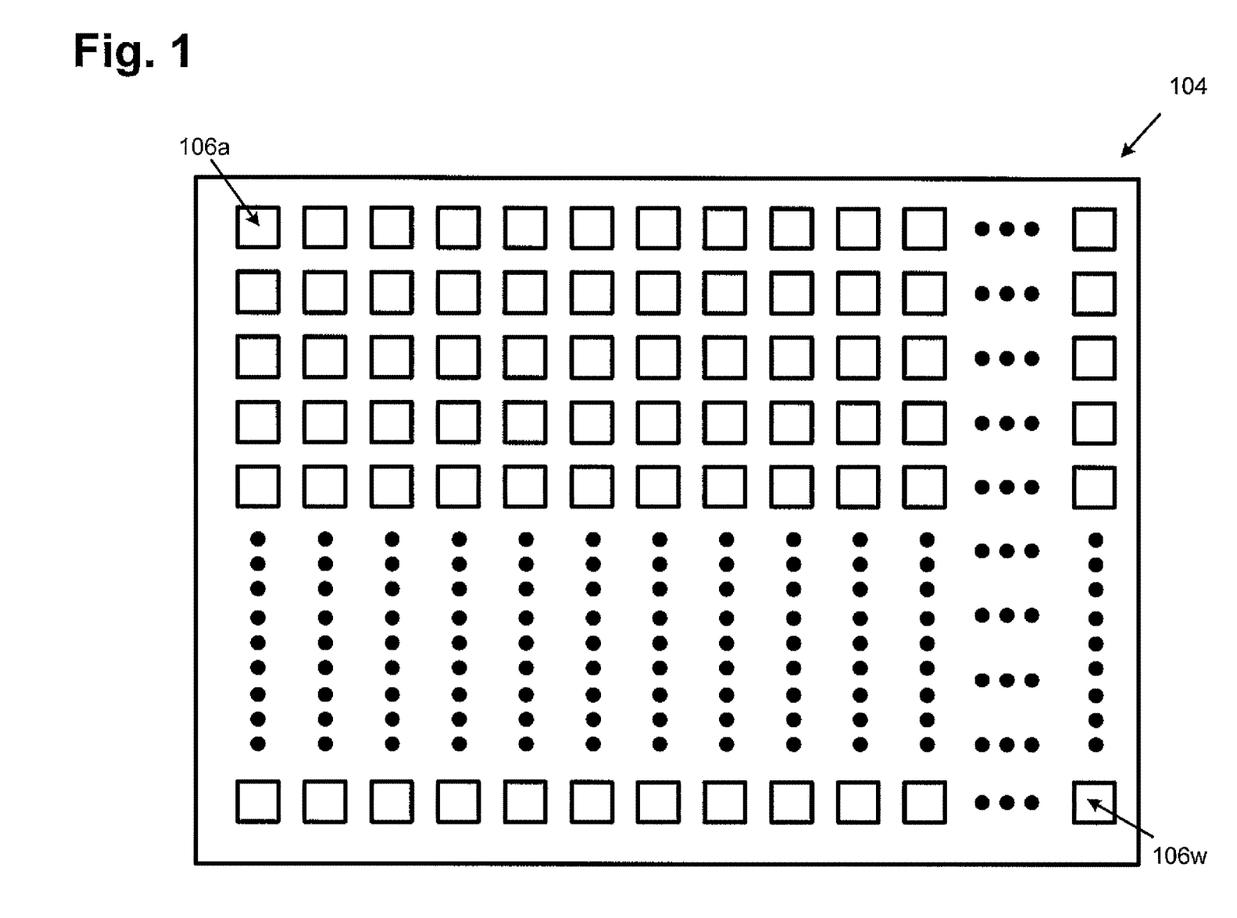
FIG. 1 illustrates a top plan view of a portion of an antenna panel of an exemplary wireless receiver according to one implementation of the present application.

Referring to FIG. 1, FIG. 1 illustrates a top plan view of a portion of an antenna panel of an exemplary wireless receiver according to one implementation of the present application. As illustrated in FIG. 1, antenna panel 104 includes a plurality of antennas, e.g., antenna 106a through 106w, collectively referred to as antennas 106. In one implementation, antennas 106 may be configured to receive signals from one or more commercial geostationary communication satellites, for example, having a very large bandwidth in the 10 GHz to 20 GHz frequency range and a very high data rate. In another implementation, antennas 106 may be configured to receive signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links.

In one implementation, for a wireless transmitter transmitting signals at 10 GHz (i.e., $\lambda=30$ mm), each antenna in antenna panel 104 in a wireless receiver needs an area of at least a quarter wavelength (e.g., $\lambda/4=7.5$ mm) by a quarter wavelength (e.g., $\lambda/4=7.5$ mm) to receive the transmitted signals. As illustrated in FIG. 1, antennas 106 in antenna panel 104 may have a square shape having dimensions of 7.5 mm by 7.5 mm, for example. In one implementation, each adjacent pair of antennas 106 may be separated by a distance of a multiple integer of the quarter wavelength (i.e., $n*\lambda/4$), such as 7.5 mm, 15 mm, 22.5 mm and etc. As illustrated in FIG. 1, antenna panel 104 includes a total of W spatially separated antennas 106. In one implementation, the number of antennas 106 can be as small as 2. In another implementation, the number of antennas 106 can be as large as several thousands (e.g., W=2000). In general, the performance of the wireless receiver improves with the number, W, of antennas 106 in antenna panel 104.

In the present implementation, antenna panel 104 is a flat panel array employing antennas 106a through 106w, where antenna panel 104 is coupled to associated active circuits to form a beam for reception (or transmission). In one implementation, the beam is formed fully electronically by means of phase control devices associated with antennas 106a through 106w. Thus, antenna panel 104 can provide beamforming without the use of mechanical parts.

Figure 2:
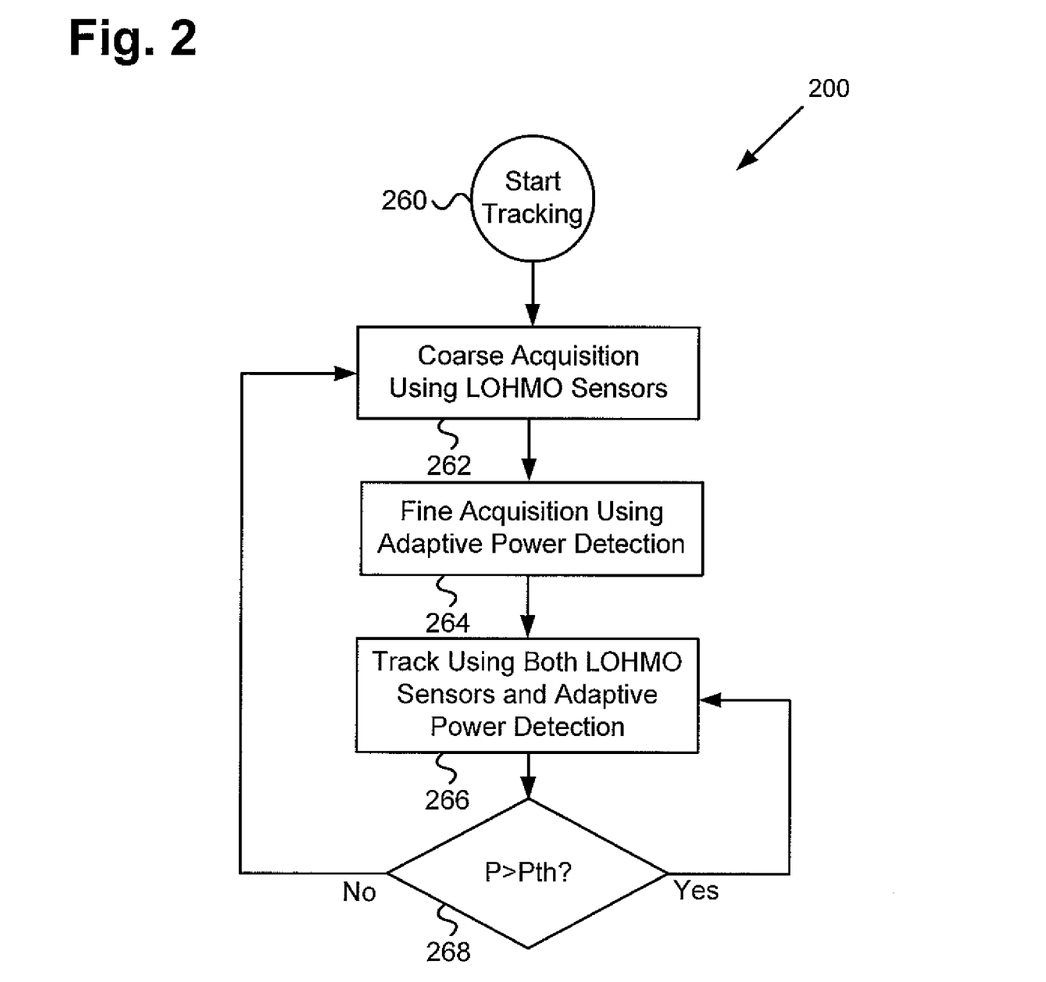
FIG. 2 illustrates a state diagram of an exemplary method utilized in a wireless receiver according to one implementation of the present application.

Referring to FIG. 2, FIG. 2 illustrates a state diagram of an exemplary method utilized in a wireless receiver according to one implementation of the present application. Certain details and features have been left out of the state diagram that are apparent to a person of ordinary skill in the art. For example, a state may consist of one or more substrates or may involve specialized equipment or materials, as known in the art. In one implementation, states 260, 262, 264, 266 and 268 indicated in state diagram 200 are sufficient to describe one implementation of the present inventive concepts, other implementations of the present inventive concepts may utilize states different from those shown in state diagram 200.

As illustrated in FIG. 2, state 260 represents a starting point of a wireless receiver tracking operation. As illustrated in state diagram 200, state 262 represents a coarse acquisition state, during which a general position of an antenna panel of the wireless receiver is acquired using one or more location, heading, and motion (LOHMO) sensors. In one implementation, the LOHMO sensors provide a general position input to a digital core to determine a general position of the antenna panel. In one implementation, the LOHMO sensors may include at least one of an accelerometer, a global positioning system (GPS), a gyroscope and a compass (which may also be referred to as a magnetometer). In one implementation, the acquired general position of the antenna panel relative to a wireless transmitter (e.g., a desired satellite) has less than a 5-degree error from the actual position of the antenna panel.

As illustrated in FIG. 2, state 264 of state diagram 200 represents a fine acquisition state, during which a precise position of the antenna panel of the wireless receiver is acquired based on adaptive power detection using power detectors and phase shifters controlled by phase feedback signals from the digital core. For example, the power detectors can measure power received from the antenna panel, and provide a precise position input to the digital core. The digital core then provides phase feedback signals to phase shifters coupled to the antennas in the antenna panel so that the wireless receiver is provided with increased power of the desired signals. In one implementation, in state 264, the precise position of the antenna panel is acquired without using any of the LOHMO sensors.

As illustrated in FIG. 2, state 266 of state diagram 200 represents a tracking state, during which both the LOHMO sensors used in the coarse acquisition state (i.e., state 262), and the adaptive power detection using the power detectors and the phase shifters controlled by the phase feedback signals from the digital core in the fine acquisition state (i.e., state 264) are used to track the power received from the antenna panel. In state 266, both inputs from the LOHMO sensors and the power detectors can be used by the digital core to provide the phase feedback signals to adjust the phase shifters coupled to the antennas in the antenna panel.

As illustrated in FIG. 2, state 268 of state diagram 200 is to determine whether the power received from the antenna panel is greater than a threshold power, for example, determined by the digital core. If the power of the desired signals received from the antenna panel is greater than the threshold power (i.e., P>Pth), state diagram 200 goes from state 268 back to state 266 to keep tracking the power. If the power received from the antenna panel is less than or equal to the threshold power (i.e., P≤Pth), state diagram 200 goes from state 268 back to state 262 to start coarse acquisition again using the LOHMO sensors. The operation of state diagram 200 will be discussed in more detail below with references to FIGS. 3A, 3B and 3C.

Figure 3A:
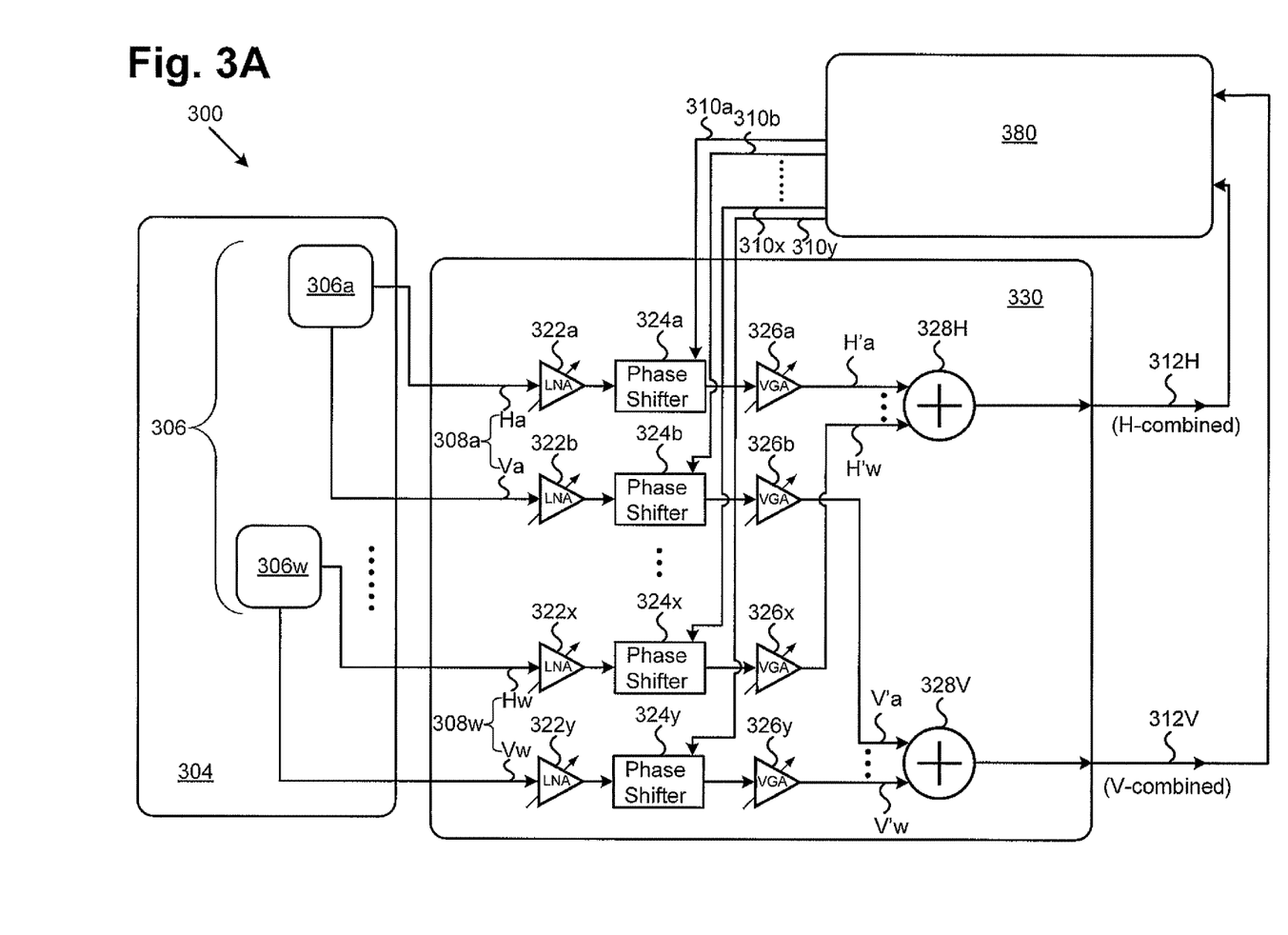
FIG. 3A illustrates a functional block diagram of an exemplary wireless receiver according to one implementation of the present application.

Referring to FIG. 3A, FIG. 3A illustrates a functional block diagram of an exemplary wireless receiver according to one implementation of the present application. As illustrated in FIG. 3A, wireless receiver 300 includes antenna panel 304 having antennas 306, H-combined/V-combined generation block 330, and hybrid tracking system 380.

In the present implementation, antenna panel 304 may correspond to antenna panel 104 in FIG. 1, where antennas 306a through 306w may correspond to antennas 106a through 106w in FIG. 1. In the present implementation, antennas 306 may be configured to receive signals from one or more commercial geostationary communication satellites, for example, which typically employ linearly polarized signals defined at the satellite with a horizontally-polarized (H) signal having its electric-field oriented parallel with the equatorial plane and a vertically-polarized (V) signal having its electric-field oriented perpendicular to the equatorial plane. As illustrated in FIG. 3A, each antenna 306 is configured to provide an H output and a V output to H-combined/V-combined generation block 330. For example, antenna 306a provides linearly polarized signal 308a, having horizontally-polarized signal Ha and vertically-polarized signal Va, to H-combined/V-combined generation block 330. Antenna 306w provides linearly polarized signal 308w, having horizontally-polarized signal Hw and vertically-polarized signal Vw, to H-combined/V-combined generation block 330.

As illustrated in FIG. 3A, horizontally-polarized signal Ha from antenna 306a is provided to a receiving circuit having low noise amplifier (LNA) 322a, phase shifter 324a and variable gain amplifier (VGA) 326a, where LNA 322a is configured to generate an output to phase shifter 324a, and phase shifter 324a is configured to generate an output to VGA 326a. In addition, vertically-polarized signal Va from antenna 306a is provided to a receiving circuit including low noise amplifier (LNA) 322b, phase shifter 324b and variable gain amplifier (VGA) 326b, where LNA 322b is configured to generate an output to phase shifter 324b, and phase shifter 324b is configured to generate an output to VGA 326b.

Similarly, antenna 306w provides linearly polarized signal 308w, having horizontally-polarized signal Hw and vertically-polarized signal Vw, to H-combined/V-combined generation block 330. As illustrated in FIG. 3A, horizontally-polarized signal Hw from antenna 306w is provided to a receiving circuit including low noise amplifier (LNA) 322x, phase shifter 324x and variable gain amplifier (VGA) 326x, where LNA 322x is configured to generate an output to phase shifter 324x, and phase shifter 324x is configured to generate an output to VGA 326x. In addition, vertically-polarized signal Vw from antenna 306w is provided to a receiving circuit including low noise amplifier (LNA) 322y, phase shifter 324y and variable gain amplifier (VGA) 326y, where LNA 322y is configured to generate an output to phase shifter 324y, and phase shifter 324y is configured to generate an output to VGA 326y.

In one implementation, at least one of horizontally-polarized signals Ha through Hw and vertically-polarized signals Va through Vw may be phase shifted in H-combined/V-combined generation block 330 by a phase shifter (e.g., phase shifters 324a through 324y), for example, based on a phase feedback signal (e.g., phase feedback signals 310a through 310y) provided by hybrid tracking system 380.

As illustrated in FIG. 3A, amplified horizontally-polarized signal H'a from VGA 326a, amplified horizontally-polarized signal H'w from VGA 326x, and other amplified horizontally-polarized signal from other antennas 306 (not explicitly shown in FIG. 3A) are provided to summation block 328H. Summation block 328H is configured to sum all of the powers of the amplified horizontally-polarized signals H'a through H'w, and combine all of the phases of the amplified horizontally-polarized signals H'a through H'w, to provide H-combined output 312H. In addition, amplified vertically-polarized signal V'a from VGA 326b, amplified vertically-polarized signal V'w from VGA 326y, and other amplified vertically-polarized signals from other antennas 306 (not explicitly shown in FIG. 3A) are provided to summation block 328V. Summation block 328V is configured to sum all of the powers of the amplified vertically-polarized signals V'a through V'w, and combine all of the phases of the amplified vertically-polarized signals V'a through V'w, to provide V-combined output 312V.

As illustrated in FIG. 3A, H-combined output 312H and V-combined output 312V from H-combined/V-combined generation block 330 are provided to hybrid tracking system 380. Hybrid tracking system 380 is configured to receive H-combined output 312H and V-combined output 312V from H-combined/V-combined generation block 330, and provide phase feedback signals 310a through 310y to adjust phase shifters 324a through 324y, respectively. Hybrid tracking system 380 will be discussed in detail with reference to FIG. 3B.

Figure 3B:
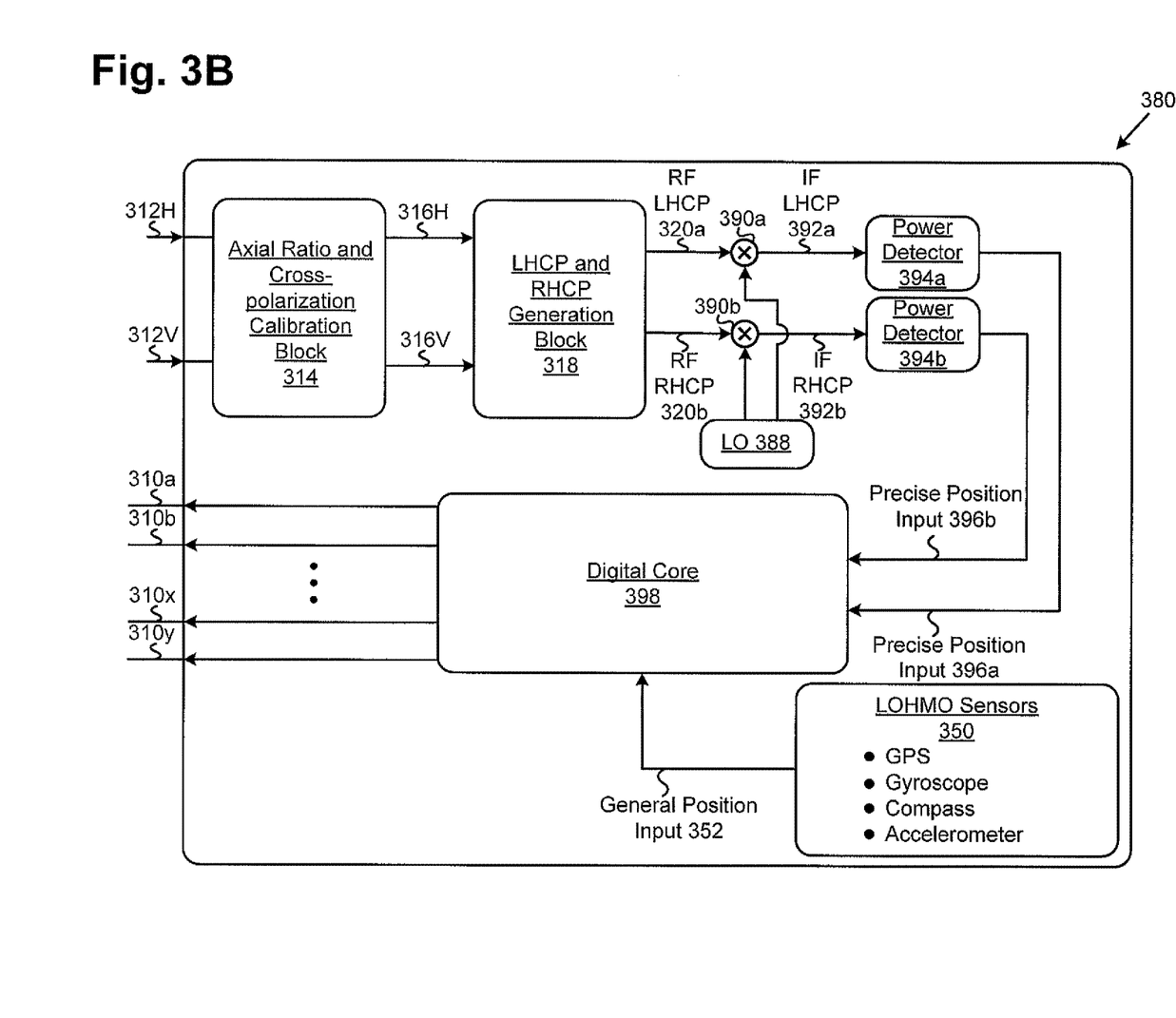
FIG. 3B illustrates a functional block diagram of a portion of a hybrid tracking system of an exemplary wireless receiver according to one implementation of the present application.

Referring to FIG. 3B, FIG. 3B illustrates a functional block diagram of a portion of a hybrid tracking system of an exemplary wireless receiver according to one implementation of the present application. As illustrated in FIG. 3B, hybrid tracking system 380 includes axial ratio and cross-polarization calibration block 314, left-handed circularly polarized (LHCP)/right-handed circularly polarized (RHCP) generation block 318, local oscillator (LO) 388, mixers 390a and 390b, power detectors 394a and 394b, digital core 398, and location, heading and motion (LOHMO) sensors 350.

As illustrated in FIG. 3B, axial ratio and cross-polarization calibration block 314 is configured to receive H-combined output 312H and V-combined output 312V, for example, from H-combined/V-combined generation block 330, which is coupled to antenna panel 304 of wireless receiver 300, as shown in FIG. 3A. Also, axial ratio and cross-polarization calibration block 314 is configured to provide H-corrected output 316H and V-corrected output 316V to LHCP/RHCP generation block 318. In one implementation, axial ratio and cross-polarization calibration block 314 is configured to correct for undesired variations in H-combined output 312H and V-combined output 312V, for example, due to a change in a position of antenna panel 304, such as a change in an elevation angle of antenna panel 304. In another implementation, undesired variations in H-combined output 312H and V-combined output 312V may be due to a change in a position of a wireless transmitter (e.g. a satellite) transmitting signals to wireless receiver 300.

As illustrated in FIG. 3B, LHCP/RHCP generation block 318 is configured to receive H-corrected output 316H and V-corrected output 316V from axial ratio and cross-polarization calibration block 314, and provide radio frequency (RF) LHCP output 320a and radio frequency (RF) RHCP output 320b to mixers 390a and 390b, respectively. It should be noted that details of axial ratio and cross-polarization calibration block 314 and LHCP/RHCP generation block 318 are discussed in a related application, U.S. patent application Ser. No. 15/225,071, filed on Aug. 1, 2016, the disclosure of which is hereby incorporated fully by reference into the present application.

As illustrated in FIG. 3B, in the present implementation, RF LHCP output 320a and RF RHCP output 320b are provided to mixers 390a and 390b, respectively, where mixers 390a and 390b are configured to operate in conjunction with local oscillator (LO) 388 to down convert respective RF LHCP output 320a and RF RHCP output 320b, for example, from radio frequency signals to intermediate frequency (IF) LHCP output 392a and intermediate frequency (IF) RHCP output 392b, respectively. In another implementation, RF LHCP output 320a and RF RHCP output 320b can be provided directly to power detectors 394a and 394b, respectively, without down conversion.

As illustrated in FIG. 3B, power detector 394a is configured to detect power of IF LHCP output 392a, and provide precise position input 396a to digital core 398, based on the measured power of the desired signals. Also, power detector 394b is configured to detect power of IF RHCP output 392b, and provide precise position input 396b to digital core 398, based on the measured power of the desired signals. Digital core 398 is configured to receive precise position inputs 396a and 396b from power detectors 394a and 394b, respectively, and general position input 352 from LOHMO sensors 350. Digital core 398 is configured to provide phase feedback signals 310 (e.g., phase feedback signals 310a, 310b, 310x and 310y) to H-combined/V-combined generation block 330 shown in FIG. 3A for causing a respective phase shift in each linearly polarized signal (e.g., linearly polarized signals 308a through 308w) received from each antennas 306 (e.g., antennas 306a through 306w) in antenna panel 304.

As illustrated in FIG. 3B, in the present implementation, LOHMO sensors 350 include both location and motion sensors. In one implementation, LOHMO sensors 350 include at least one of an accelerometer, a global positioning system (GPS), a gyroscope and a compass, or any combination thereof. A location of antenna panel 304 may be detected by a number of means, including using a compass and a global positioning system (GPS) that can provide accurate terrestrial location data. Heading of the antenna panel shows which direction the antenna panel is heading and facing with accuracy. In addition, a movement of antenna panel 304 may be detected by any number of means, including using inertial sensors, such as an accelerometer, a gyroscope and others, that can track motion and orientation of antenna panel 304 in terms of speed and direction. For example, an accelerometer may be used to measure an acceleration and direction of motion of antenna panel 304. A gyroscope may be used to provide data useful in determining orientation, and the rate of change of orientation associated with antenna panel 304. In one implementation, a compass may be an e-compass or a magnetic compass. In one implementation, a gyroscope and/or an accelerometer may be implemented as one or more semiconductor devices (e.g., MEMS devices), integrated chips, accelerometer sensor systems, or other devices capable of measuring angular velocities and accelerations and/or linear accelerations of antenna panel 304.

As illustrated in FIG. 3B, LOHMO sensors 350 provides general position input 352 to digital core 398. For example, general position input 352 can provide location and motion information including, but is not limited to, information such as GPS location, velocity data, velocity rate of change information, accelerometer data, gyroscope data, compass data, and etc. Based on these data, digital core 398 can calculate and track how antenna panel 304 is moving.

Figure 3C:
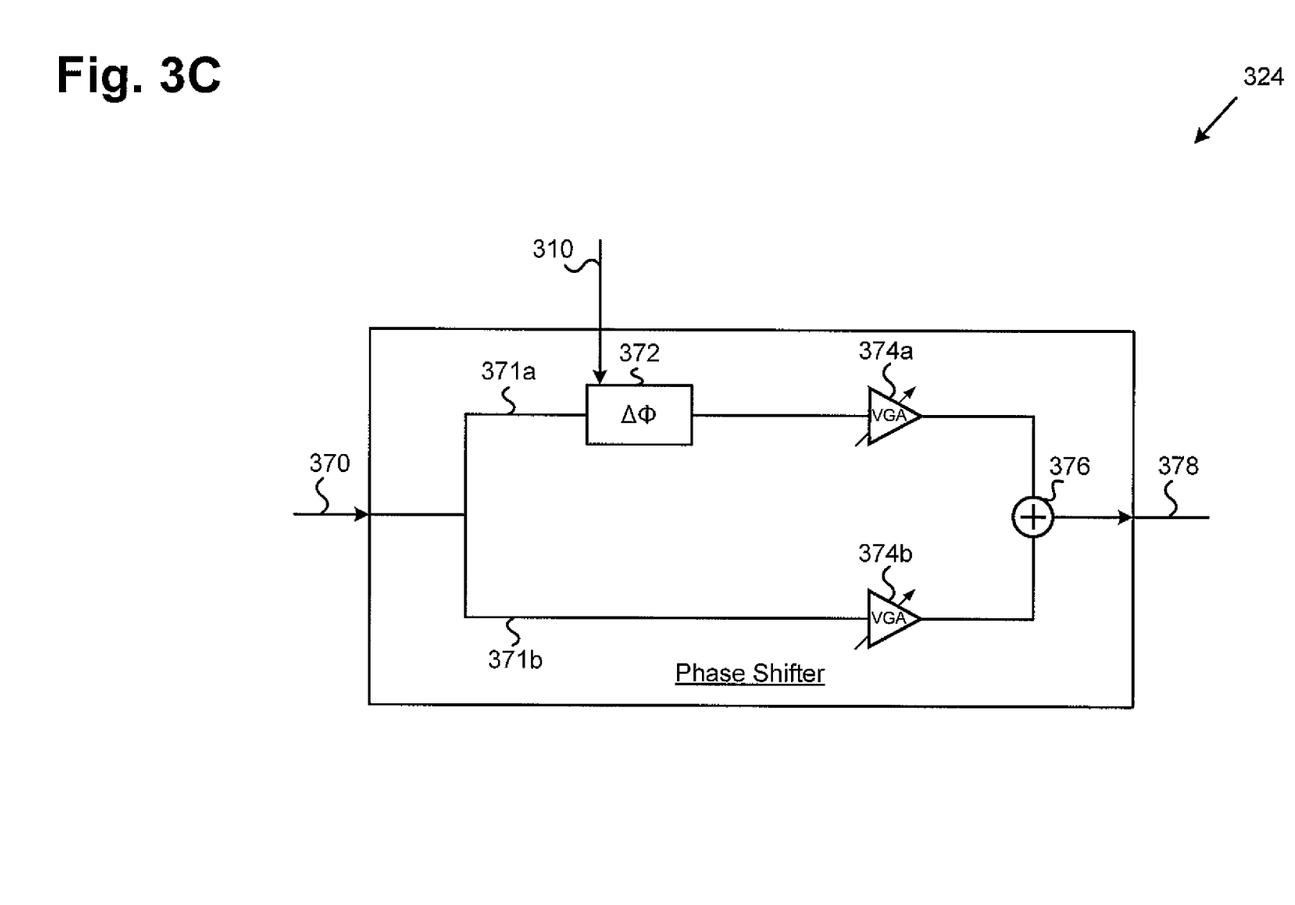
FIG. 3C illustrates a functional block diagram of an exemplary phase shifter in an H-combined/V-combined generation block of an exemplary wireless receiver according to one implementation of the present application.

Referring to FIG. 3C, FIG. 3C illustrates a functional block diagram of an exemplary phase shifter in an H-combined/V-combined generation block of an exemplary wireless receiver according to one implementation of the present application. As illustrated in FIG. 3C, phase shifter 324 may correspond to any of phase shifters 324a through 324y in H-combined/V-combined generation block 330 in FIG. 3A. As illustrated in FIG. 3C, phase shifter 324 is configured to receive signal 370 (e.g., from any of LNAs 322a through 322y in FIG. 3A), and phase feedback signal 310 (e.g., any of phase feedback signals 310a through 310y in FIG. 3A). Phase shifter 324 is configured to provide phase shifted signal 378, for example, to any of VGAs 326a through 326y in FIG. 3A. As illustrated in FIG. 3C, in phase shifter 324, a portion of signal 370 is provided to phase shifting module 372 and VGA 374a in path 371a, while another portion of signal 370 is provided to VGA 374b in path 371b, where the two portions are combined by combiner 376 to provide phase shifted signal 378 at the output of phase shifter 324. As can be seen in FIG. 3C, phase shifter 324 is configured to adjust the amount of phase shift of signal 370 based on phase feedback signal 310, for example, provided by digital core 398 of hybrid tracking system 380.

The operation of wireless receiver 300 is now discussed with reference to FIGS. 2, 3A, 3B and 3C. After wireless receiver 300 starts a tracking operation in state 260 of state diagram 200 shown in FIG. 2, wireless receiver 300 enters a coarse acquisition state (i.e., state 262), during which a general position of antenna panel 304 of wireless receiver 300 is acquired using one or more LOHMO sensors 350. In one implementation, LOHMO sensors 350 may include at least one of an accelerometer, a global positioning system (GPS), a gyroscope and a compass, or any combination thereof. As illustrated in FIG. 3B, LOHMO sensors 350 provide general position input 352 to digital core 398 to determine a general position of antenna panel 304, where general position input 352 includes location, heading and motion information, such as GPS location, velocity data, velocity rate of change information, accelerometer data, gyroscope data, compass data, and etc. In one implementation, the acquired general position of the antenna panel relative to a wireless transmitter (e.g., a desired satellite) has less than a 5-degree error from the actual position and heading or direction of the antenna panel.

After the general position of wireless receiver 300 is acquired, wireless receiver 300 enters a fine acquisition state (i.e., state 264), during which a precise position of antenna panel 304 of wireless receiver 300 is acquired based on adaptive power detection using power detectors 394a and 394b and phase shifters 324a through 324y controlled by respective phase feedback signals 310a through 310y provided by digital core 398. For example, power detectors 394a and 394b measure respective powers of IF LHCP output 392a and IF RHCP output 392b received from antenna panel 304, and provide precise position inputs 396a and 396b, respectively, to digital core 398. Digital core 398 then provides phase feedback signals 310a through 310y to phase shifters 324a through 324y, respectively, which are coupled to respective antennas 306a through 306w in antenna panel 304 so as to increase the power of desired signals received from antenna panel 304. In one implementation, in state 264, the precise position of antenna panel 304 is acquired without using any of LOHMO sensors 350.

After the precise position of wireless receiver 300 is acquired, wireless receiver 300 enters a tracking state (i.e., state 266), during which hybrid tracking system 380 continues to track the position of antenna panel 304 of wireless receiver 300 using both LOHMO sensors 350 and power detectors 394a and 394b and phase shifters 324a through 324y controlled by phase feedback signals 310a through 310y from digital core 398. For example, in state 266, both inputs from LOHMO sensors 350 and power detectors 394a and 394b can be provided to digital core 398 to track and/or adjust respective phase shifters 324a through 324y coupled to antennas 306a through 306w, respectively, in antenna panel 304, through phase feedback signals 310a through 310y, respectively.

It is noted that LOHMO sensors 350 may have an update/refresh rate on the order of kilo-Hertz (i.e., 10^3 hertz) during the coarse acquisition state (i.e., state 262), while power detectors 394a and 394b and phase shifters 324a through 324y working in conjunction with digital core 398 may have an update/refresh rate on the order of mega-Hertz (i.e., 10^6 hertz) during the fine acquisition state (i.e., state 264). The combination of using both LOHMO sensors 350, and power detectors 394a and 394b, phase shifters 324a through 324y and digital core 398 provides a high refresh rate and precision tracking in the tracking state (i.e., state 266).

As illustrated in state diagram 200, in state 268, digital core 398 determines whether the power received from antenna panel 304 is greater than a threshold power. If the power received from antenna panel 304 is greater than the threshold power (i.e., P>Pth), state diagram 200 goes from state 268 back to state 266 to keep tracking the power. If the power received from antenna panel 304 is less than or equal to the threshold power (i.e., P≤Pth), state diagram 200 goes from state 268 back to state 262 to start coarse acquisition again using LOHMO sensors 350. As such, among other advantages, hybrid tracking system 380 provides an effective system to accurately track the location and movement of wireless receiver 300, in particular antenna panel 304, to adjust phase shifters 324a through 324y to increase the power of desired signals received from antennas 306.

Figure 4:
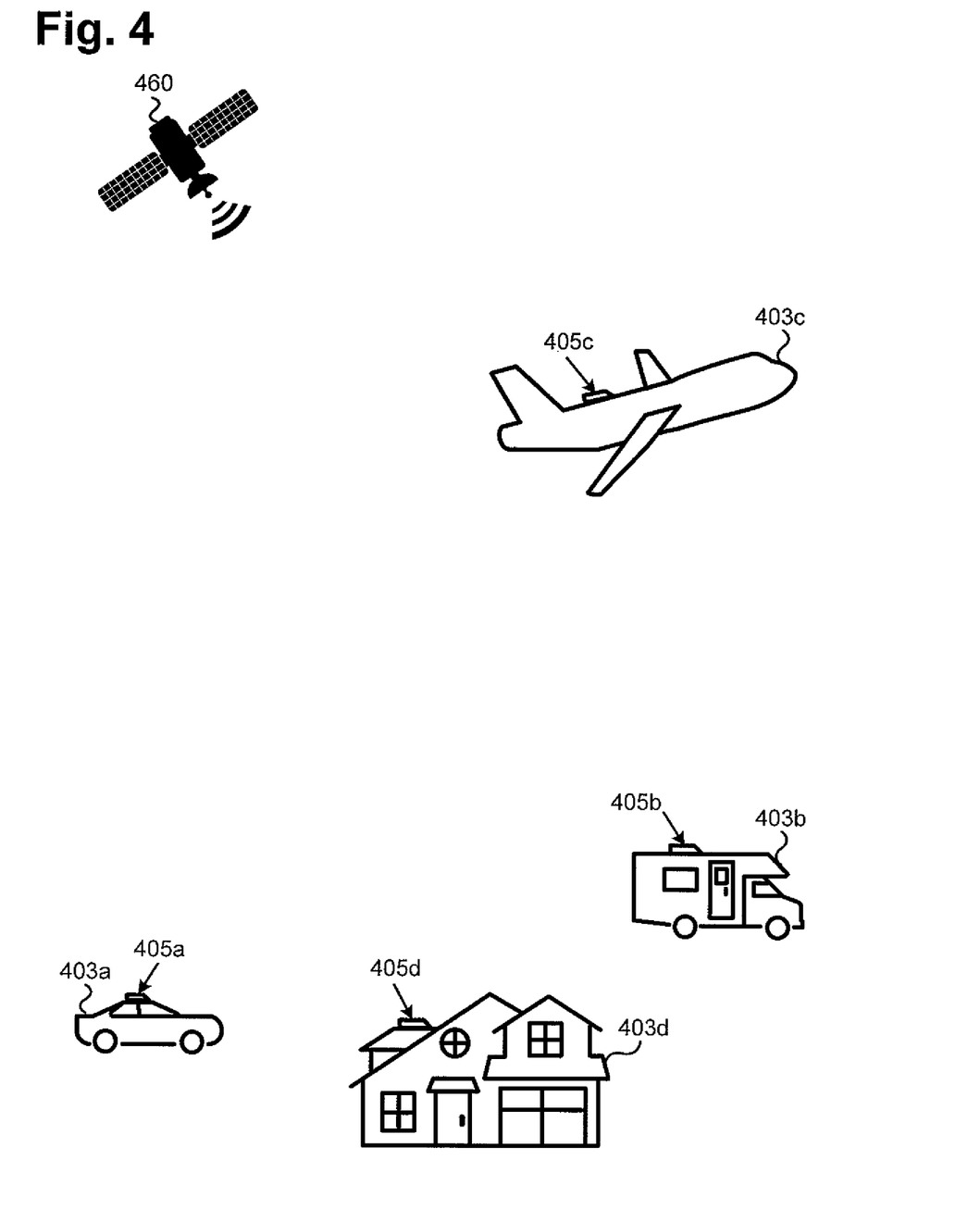
FIG. 4 illustrates an exemplary wireless communications system utilizing exemplary wireless receivers according to one implementation of the present application.

Referring now to FIG. 4, FIG. 4 illustrates an exemplary wireless communications system employing wireless receivers with position tracking, using LOHMO sensors and adaptive power detection, according to one implementation of the present application. As illustrated in FIG. 4, wireless transmitter 460 (e.g., satellite) is configured to transmit signals to various targeted wireless receivers, such as wireless receiver 405a mounted on car 403a, wireless receiver 405b mounted on recreational vehicle 403b, wireless receiver 405c mounted on airplane 403c and wireless receiver 405d mounted on house 403d. It should be understood that car 403a, recreational vehicle 403b and airplane 403c may each be moving, thereby causing a change in position (e.g., a general position or a precise position) of an antenna panel in corresponding wireless receivers 405a through 405c. It should be understood that, although house 403d can be stationary, the relative position of wireless receiver 405d to wireless transmitter 460 may also change, for example, due to wind or other factors. In the present implementation, wireless receivers 405a through 405d may each correspond to wireless receiver 300 in FIG. 3A, where a hybrid tracking system (e.g., hybrid tracking system 380 in FIGS. 3A and 3B) is configured to perform high refresh rate and high precision tracking to increase the power of desired signals in each wireless receiver 405a through 405d as discussed above.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A method for use in a wireless receiver, said method comprising:
   acquiring, by a digital core, a general position input from location, heading and motion (LOHMO) sensors during a coarse acquisition state;
   acquiring, by said digital core, a precise position input from power detectors during a fine acquisition state;
   entering, by said wireless receiver, said coarse acquisition state when said digital core determines that a power received from said antenna panel falls below a threshold power.

2. The method of claim 1 wherein said LOHMO sensors further comprise a global positioning system (GPS).

3. The method of claim 1 wherein each antenna in said antenna panel provides a horizontally-polarized signal and a vertically-polarized signal to an H-combined/V-combined generation block.

4. The method of claim 1 wherein each horizontally-polarized signal and vertically-polarized signal provided by said antenna panel is coupled to a phase shifter in an H-combined/V-combined generation block.

5. The method of claim 1 further comprising providing phase feedback signals to an H-combined/V-combined generation block so as to cause a phase shift in at least one linearly polarized signal received from at least one antenna in said antenna panel.

6. The method of claim 1 further comprising providing phase feedback signals to an H-combined/V-combined generation block so as to cause a respective phase shift in each linearly polarized signal received from each antenna in said antenna panel.

7. The method of claim 1 further comprising providing at least one phase feedback signal to at least one phase shifter in an H-combined/V-combined generation block.

8. The method of claim 1 further comprising providing each of phase feedback signals to a corresponding phase shifter in an H-combined/V-combined generation block.

9. The method of claim 1 wherein said wireless receiver is mounted on a vehicle causing a change in said general position or in said precise position of said antenna panel.

10. The method of claim 1 wherein each of said power detectors measures power of a circularly polarized signal.

* * * * *